(12) United States Patent
Davis et al.

(10) Patent No.: US 11,002,176 B2
(45) Date of Patent: May 11, 2021

(54) TEMPERATURE REGULATOR WITH A UNITARY HOUSING, THERMOSTATIC VALVES AND VALVE HOLDERS

(71) Applicant: Caterpillar Inc., Deerfield, IL (US)

(72) Inventors: Douglas E. Davis, Lafayette, IN (US); Mark W. Meyer, Pendleton, IN (US); Brad Patera, Jenison, MI (US)

(73) Assignee: Caterpillar Inc., Peoria, IL (US)

( * ) Notice: Subject to any disclaimer, the term of this patent is extended or adjusted under 35 U.S.C. 154(b) by 125 days.

(21) Appl. No.: 15/995,797

(22) Filed: Jun. 1, 2018

(65) Prior Publication Data

US 2019/0368409 A1    Dec. 5, 2019

(51) Int. Cl.
| | |
|---|---|
| *F01P 7/16* | (2006.01) |
| *F16K 31/00* | (2006.01) |
| *F01P 7/14* | (2006.01) |
| *F01P 3/20* | (2006.01) |

(52) U.S. Cl.
CPC ............ *F01P 7/165* (2013.01); *F16K 31/002* (2013.01); *F01P 3/20* (2013.01); *F01P 7/14* (2013.01); *F01P 7/16* (2013.01); *F01P 2031/32* (2013.01); *F01P 2060/16* (2013.01)

(58) Field of Classification Search
CPC ........... F01P 7/165; F01P 2060/16; F01P 7/16
See application file for complete search history.

(56) References Cited

U.S. PATENT DOCUMENTS

| 2,556,479 | A | * | 6/1951 | McGrath | ................... F24F 11/83 236/1 C |
| 2,694,904 | A | * | 11/1954 | Lange | ................... F25B 47/022 62/198 |
| 2,754,062 | A | * | 7/1956 | Von Wangenheim | ....................... G05D 23/022 236/34.5 |
| 2,968,292 | A | * | 1/1961 | Kelly | ....................... F01P 3/207 123/41.08 |
| 3,467,119 | A | * | 9/1969 | Dykzeul | ............ G05D 16/0641 137/66 |
| 3,752,132 | A | * | 8/1973 | Bentz | ....................... F01P 7/165 123/563 |
| 4,096,838 | A | * | 6/1978 | Tanaka | ................... F02M 69/22 123/453 |
| 5,647,531 | A | * | 7/1997 | Kline | ................. G05D 23/1346 236/12.14 |

(Continued)

FOREIGN PATENT DOCUMENTS

WO    WO 2016/100670 A1    6/2016

*Primary Examiner* — Edward F Landrum
*Assistant Examiner* — Alexis K Cox
(74) *Attorney, Agent, or Firm* — Leydig, Voit & Mayer, LTD.

(57) ABSTRACT

Fluid temperature regulator includes a unitarily-formed housing having an inlet, outlet, bypass outlet, and plurality of valve chamber openings, in line with respective valve chambers. Valve holders are removably disposed within valve chamber openings to position thermostatic valves within the valve chambers. Each valve holder includes at least one wall having at least one holder outlet opening and holder bypass outlet opening. First and second regulator flowpaths through the regulator are defined through the regulator inlet to either the regulator bypass outlet or regulator outlet depending upon whether the thermostatic valves are disposed in a first or second configuration, respectively.

15 Claims, 3 Drawing Sheets

(56) References Cited

U.S. PATENT DOCUMENTS

| | | |
|---|---|---|
| 6,471,133 B1 | 10/2002 | O'Flynn et al. |
| 2010/0186684 A1* | 7/2010 | Utsuno ................... F01N 5/02 123/41.1 |
| 2015/0030468 A1* | 1/2015 | Martens ............... F04C 29/042 417/53 |
| 2016/0333766 A1 | 11/2016 | Bohrer et al. |

* cited by examiner

TEMPERATURE REGULATOR WITH A UNITARY HOUSING, THERMOSTATIC VALVES AND VALVE HOLDERS

TECHNICAL FIELD

This patent disclosure relates generally to fluid temperature regulators and, more particularly to a temperature regulator having a unitary housing with a thermostatic valve.

BACKGROUND

Fluid temperature regulators that use wax element thermostatic valves generally consist of two housings with the thermostatic valves positioned within the housings within large machinery. This requires the separation of the two housings to access the thermostatic valves for service or replacement. Accessing the thermostatic valves typically requires the temperature regulator to be removed from the piping circuit so that the housings can be separated, increasing the difficulty of servicing the thermostatic valves, particularly in the field, as well as the associated costs and potential for damage to the thermostatic valves, housings, and fluid connections to the piping circuit. Further, inasmuch as the two main housings are typically either cast iron or bronze, fabrication of the housings can greatly increase the cost of the housings, and, accordingly, the temperature regulator.

U.S. Pat. No. 6,471,133 B1 discloses a combination radiator and thermostat assembly. The arrangement includes a thermostat cartridge assembly within a housing adjacent the radiator of a cooling system in an automotive vehicle.

SUMMARY

The disclosure describes, in one aspect, a fluid temperature regulator for a machine. The fluid temperature regulator includes a unitarily-formed housing having a temperature regulator inlet, a temperature regulator outlet, a temperature regulator bypass outlet, a plurality of valve chamber openings, and a plurality of valve chambers. The fluid temperature regulator further includes at least one thermostatic valve holder removably disposed within at least one of the plurality of valve chamber openings and at least partially within at least one of the plurality of valve chambers. The thermostatic valve holder includes at least one wall defining at least one channel and a holder inlet opening into the channel. The wall further includes at least one holder outlet opening and at least one holder bypass outlet opening. The fluid temperature regulator further includes a plurality of thermostatic valves equal in number to the plurality of valve chambers. Each of the plurality of thermostatic valves includes a first configuration and a second configuration. At least one of the plurality of thermostatic valves is disposed through the holder inlet opening and at least partially within at least one channel of the at least one thermostatic valve holder at partially within the at least one of the plurality of valve chambers. A first regulator flowpath through the temperature regulator is defined through the temperature regulator inlet, at least one of the plurality of thermostatic valves disposed in the first configuration, the holder bypass outlet opening, and the temperature regulator bypass outlet. A second regulator flowpath through the temperature regulator is defined through the temperature regulator inlet, the at least one of the plurality of thermostatic valves disposed in the second configuration, the holder outlet opening, and the temperature regulator outlet.

The disclosure describes, in a more specific aspect, a thermostatic valve holder adapted to receive a wax thermostatic valve and be positioned within a housing of a temperature regulator. The thermostatic valve holder includes a cup-shaped sealing wall and at least one wall defining a channel and a holder inlet opening into the channel, the holder inlet opening being sized to receive the wax thermostatic valve. The sealing wall includes a generally-cylindrical sidewall and a base. An upstanding central post extends outward from the base such that the post is accessible within the generally-cylindrical sidewall. The at least one wall extends from the base opposite the post and the generally-cylindrical sidewall. The at least one wall includes at least one holder outlet opening and at least one holder bypass outlet opening. A flange extends from the generally-cylindrical sidewall opposite the base.

DETAILED DESCRIPTION

Figure 1:
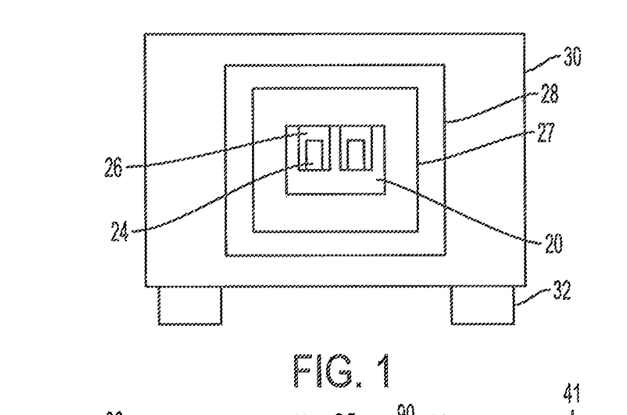
FIG. 1 is a diagram schematically representing a machine incorporating a temperature regulator in accordance with teachings of this disclosure.

This disclosure relates to a temperature regulator 20 with a unitary housing 22, a plurality of thermostatic valves 24, and at least one thermostatic valve holder 26 for use in a cooling system 27 in an engine 28 of a machine 30, as illustrated in the diagram of FIG. 1 and the remaining figures. As shown in FIG. 1, for example, the machine 30 may optionally include a plurality of motivators 32. While the arrangement is illustrated in connection with a truck, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others. By way of further example, the engine could also be used to drive industrial equipment such as: a generator for electric power, a compressor for gas compression, a gearbox or propeller for marine vessel propulsion, a turntable for drilling, or a mechanical or electric drive locomotive. The temperature regulator could also be used to control fluid temperatures for an industrial process, whether or not associated with an engine.

Figure 2:
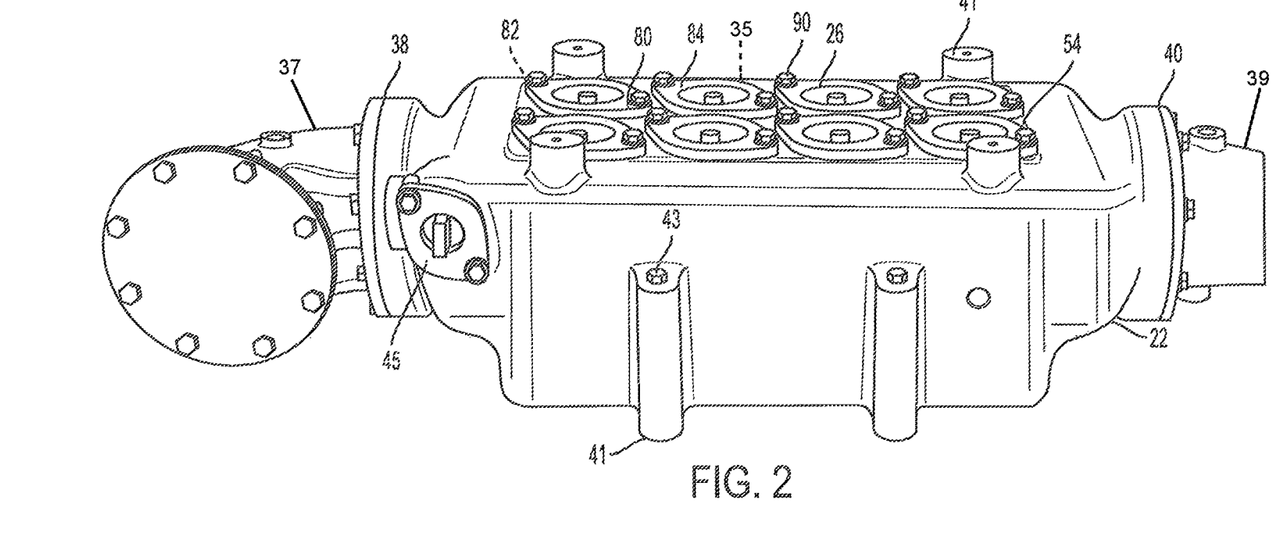
FIG. 2 is an isometric view of a temperature regulator and exemplary associated connections in accordance with teachings of this disclosure.
Figure 3:
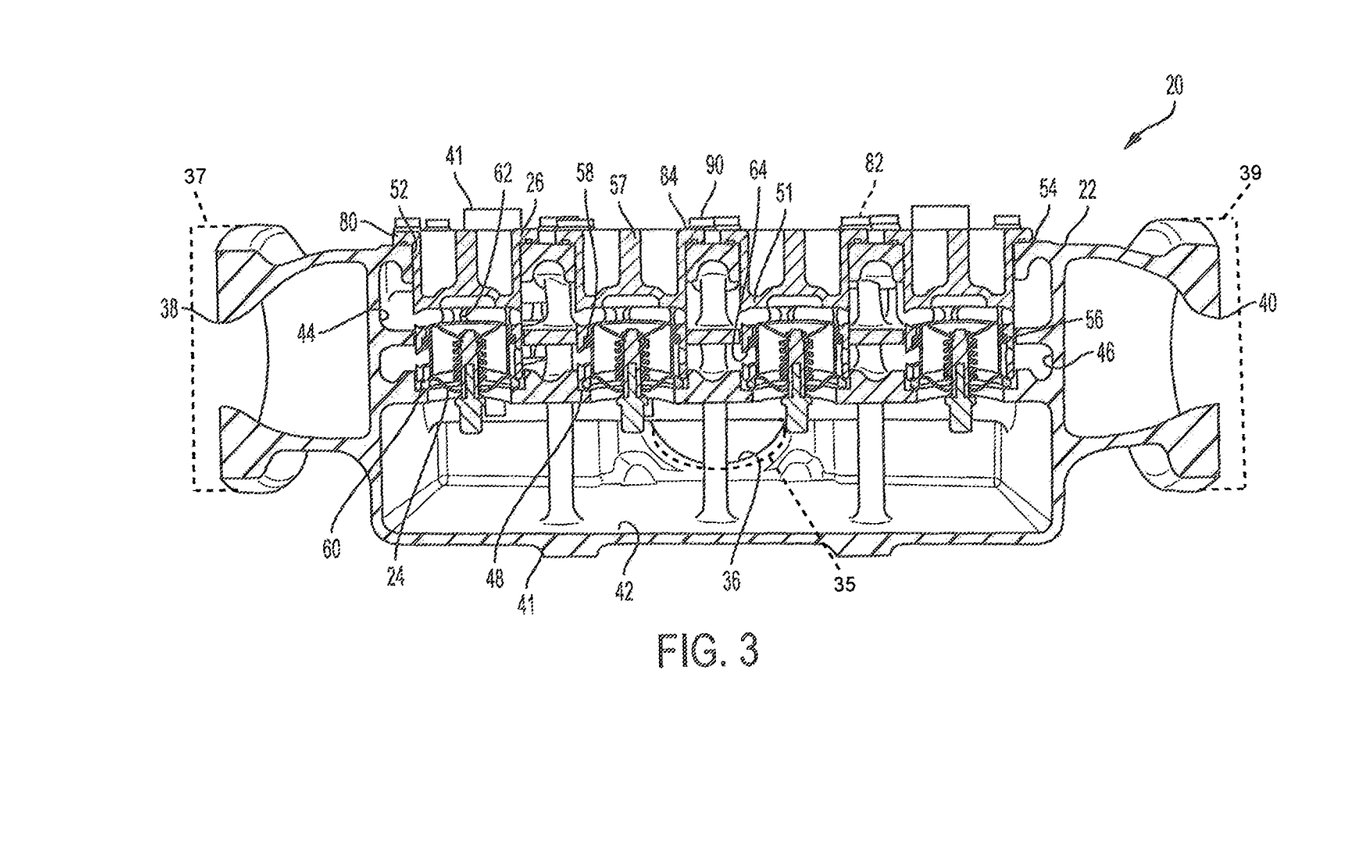
FIG. 3 is a cross-sectional view of the temperature regulator of FIG. 2.

Turning to FIGS. 2-3, the temperature regulator 20 includes a housing 22 including a temperature regulator inlet 36, a temperature regulator outlet 38, and a temperature regulator bypass outlet 40. An inlet connection 37, an outlet connection 39, and a bypass outlet connection 41 may be provided to fluidly couple the temperature regulator inlet 36, a temperature regulator outlet 38, and a temperature regulator bypass outlet 40, respectively, with the cooling system 27.

The housing 22 may include one or more attachment structures by which the housing may be further mounted to the engine 28, frame, or other structure of the machine 30. In the illustrated embodiment, a plurality of bosses 41 are provided for receipt of coupling bolts 43. The housing 22 may further include a venting structure 45 by which the interior of the temperature regulator 20 may be selectively vented.

As illustrated in FIG. 3, the housing 22 includes a plurality of channels. More specifically, the housing 22 includes a temperature regulator inlet channel 42 in disposed fluid cooperation with the temperature regulator inlet 36, a temperature regulator outlet channel 46 in fluid cooperation with the temperature regulator outlet 38, and temperature regulator bypass outlet channel 44 in fluid cooperation with the temperature regulator bypass outlet 40.

The housing 22 further includes a plurality of valve chambers 48 which fluidly connect the temperature regulator inlet channel 42 to the temperature regulator bypass outlet channel 44 and the temperature regulator outlet channel 46. A plurality of thermostatic valves 24 are at least partially disposed within the respective valve chambers 48. The number of thermostatic valves 24 is equal to the number of valve chambers 48 in the housing 22. Those of skill in the art will appreciate that the thermostatic valves 24 control the flow of fluid from the temperature regulator inlet 36 and temperature regulator inlet channel 42 to either or both of the temperature regulator outlet channel 46 and temperature regulator outlet 38, and the temperature regulator bypass outlet channel 44 and temperature regulator bypass outlet 40, depending upon the positions of components of the thermostatic valves 24.

According to teachings of this disclosure, the housing 22 is unitarily formed, and includes a plurality of valve chamber openings 52 extending through an outer surface 54 of the housing 22. The valve chamber openings 52 are disposed in line with the plurality of valve chambers 48. In this way, a thermostatic valve 24 inserted through a valve chamber opening 52 may be positioned within one of the valve chamber 48 within the unitary housing 22.

The housing 22 may be formed by any appropriate method. For example, the housing 22 may be cast iron or some other combination of metals. Additionally, the housing 22 may be machined.

According to further teachings of this disclosure, and in order to properly position the thermostatic valves 24 within the valve chambers 48, at least one thermostatic valve holder 26 is removably disposed within at least one of the plurality of valve chamber openings 52 and at least partially within at least one of the plurality of valve chambers 48. The thermostatic valve holder 26 at least one sealing wall 51 that seals the associated valve chamber opening 52 in the housing 22 when positioned through the valve chamber opening 52 and into the associated valve chamber 48.

Figure 4:
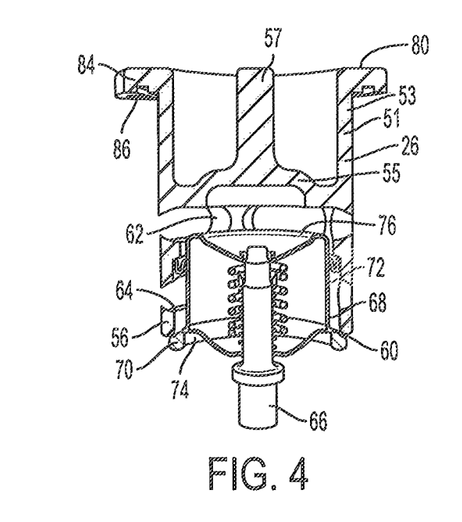
FIG. 4 is an enlarged cross-sectional view of a thermostat and holder of the temperature regulator of FIGS. 2-3 in a fully closed configuration.
Figure 5:
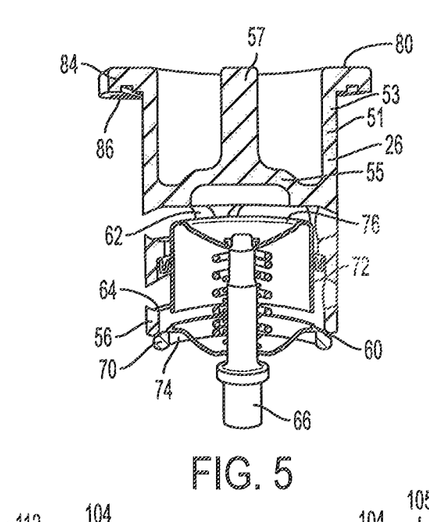
FIG. 5 is an enlarged cross-sectional view of a thermostat and holder of the temperature regulator of FIGS. 2-4 in a partially open configuration.
Figure 6:
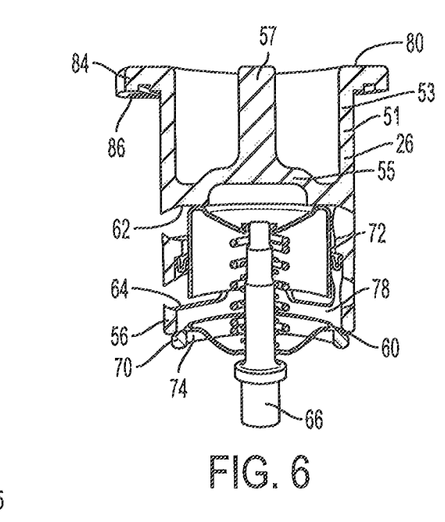
FIG. 6 is an enlarged cross-sectional view of a thermostat and holder of the temperature regulator of FIGS. 2-5 in a fully open configuration.

In the embodiment illustrated in FIGS. 4-6, the at least one sealing wall 51 is a cup-shaped structure opening to an exterior of the housing 22 when removably disposed through the valve chamber opening 52 in the housing 22. The at least one sealing wall 51 includes a generally-cylindrical sidewall 53 and a base 55. An upstanding central post 57 extends outward from the base 55 such that the post 57 is accessible from the exterior of the housing 22.

As shown in FIGS. 4-6, the thermostatic valve holder 26 further includes at least one wall 56 defining at least one channel 58 and a holder inlet 60 opening into the channel. The at least one wall 56 further includes at least one holder outlet opening 64 and at least one holder bypass outlet opening 62. In the illustrated embodiment, the at least one wall 56 extends from the base 55 opposite the post 57, and is coaxial with the generally-cylindrical sidewall 53. When the wall 56 of the thermostatic valve holder 26 is at least partially disposed within a respective one of the valve chambers 48 of the housing 22, the holder inlet 60 is fluidly connected with the temperature regulator inlet channel 42, while the at least one holder outlet opening 64 fluidly connects with the temperature regulator outlet channel 46, and the holder bypass outlet opening 62 fluidly connects with the temperature regulator bypass outlet channel 44.

A thermostatic valve 24 is at least partially disposed within each of the valve chambers 48. In at least one such disposition, the thermostatic valve 24 is at least partially disposed within at least one channel 58 of the thermostatic valve holders 26, which in turn is at least partially disposed within at least one of the valve chambers 48. In this way, the operation of each thermostatic valve 24 controls the direction of fluid flow from the temperature regulator inlet channel 42 to either or both of the at least one holder outlet opening 64 to the temperature regulator outlet channel 46, and the holder bypass outlet opening 62 to the temperature regulator bypass outlet channel 44. Thus, when a thermostatic valve 24 is disposed within a thermostatic valve holder 26, the fluid flow between the temperature regulator inlet channel 42 and either or both of the temperature regulator outlet channel 46 and temperature regulator bypass outlet channel 44 is determined by the positions of the components of the thermostatic valve 24.

The structure and operation of the thermostatic valves 24 will be understood by those of skill in the art. According to at least one embodiment, at least one thermostatic valve 24 is a wax thermostatic valve, the operation of which will be understood by those of skill in the art.

Further description of the illustrated thermostatic valve 24 is provided by way of example only. Referring to FIGS. 4-6, each of the plurality of thermostatic valves 24 includes a sensing element (not visible) disposed within an actuator 66. In the illustrated thermostatic valve 24, the actuator 66 is a piston-like structure, expansion of the sensing element contained within the actuator 66 causing an extension of the rod relative to the cylinder of the piston. The thermostatic valve 24 additionally includes a thermostatic valve housing assembly 68. The thermostatic valve housing assembly 68 includes a first thermostatic valve housing portion 70 and a second thermostatic valve housing portion 72, which are moveable relative to one another. In this embodiment, the first thermostatic valve housing portion 70 has a ring-like structure disposed within the holder inlet 60 with a flange disposed along an end surface of the wall 56 of the channel 58. The first thermostatic valve housing portion 70 defines a thermostatic valve inlet 74. The second thermostatic valve housing portion 72 has a generally tubular structure. The cylinder of the actuator 66 is coupled to the first thermostatic valve housing portion 70, while the rod of the actuator 66 is coupled to the second thermostatic valve housing portion 72 so that extension of the actuator 66 results in a relative movement between the first and second thermostatic valve housing portions 70, 72. The thermostatic valve housing assembly 68 defines a thermostatic valve outlet 78 when the second thermostatic valve housing portion 72 is disposed adjacent the first thermostatic valve housing portion 70, and a thermostatic valve bypass outlet 76 when the second thermostatic valve housing portion 72 is not disposed adjacent the first thermostatic valve housing portion 70. In this way, the relative positions of the first and second thermostatic valve housing portions 70, 72 define a flow of fluid through the thermostatic valve 24 between the thermostatic valve inlet 74 and either or both of the thermostatic valve outlet 78 and thermostatic valve bypass outlet 76.

The thermostatic valve 24 includes at least a first configuration and a second configuration. The first configuration, illustrated in FIG. 4, is a fully closed configuration wherein fluid entering the thermostatic valve housing assembly 68 through the thermostatic valve inlet 74 is directed to the thermostatic valve bypass outlet 76. The second configuration, illustrated in FIG. 6, is a fully open configuration wherein fluid entering the thermostatic valve housing assembly 68 through the thermostatic valve inlet 74 is directed to the thermostatic valve outlet 78. A partially open configuration is illustrated in FIG. 5, wherein fluid entering the thermostatic valve housing assembly 68 through the thermostatic valve inlet 74 is directed to both the thermostatic valve bypass outlet 76 and the thermostatic valve outlet 78.

A first temperature regulator flowpath is defined through the temperature regulator inlet 36, the thermostatic valve 24 disposed in the first configuration, and the temperature regulator bypass outlet 40; a second temperature regulator flowpath is defined through the temperature regulator inlet 36, the thermostatic valve 24 disposed in the second configuration, and the temperature regulator outlet 38. More specifically, when a thermostatic valve 24 is disposed in the first configuration, that is, the fully closed position illustrated in FIG. 4, all flow from the temperature regulator inlet channel 42 entering the thermostatic valve 24 through the thermostatic valve inlet 74 is directed through the thermostatic valve 24 to the thermostatic valve bypass outlet 76 and the holder bypass outlet opening 62 to the temperature regulator bypass outlet channel 44. Conversely, when a thermostatic valve 24 is disposed in the second configuration, that is, the fully open position illustrated in FIG. 6, all flow from the temperature regulator inlet channel 42 entering the thermostatic valve 24 through the thermostatic valve inlet 74 is directed through the thermostatic valve 24 to the thermostatic valve outlet 78 and the holder outlet opening 64 to the temperature regulator outlet channel 46.

When the thermostatic valve 24 is in a partially open position illustrated in FIG. 5, flow from the temperature regulator inlet channel 42 entering the thermostatic valve 24 through the thermostatic valve inlet 74 is directed through the thermostatic valve 24 to the thermostatic valve bypass outlet 76 and the holder bypass outlet opening 62 to the temperature regulator bypass outlet channel 44, as well as the thermostatic valve outlet 78 and the holder outlet opening 64 to the temperature regulator outlet channel 46. This combination flow may occur, for example, when the thermostatic valve 24 is transitioning from the first configuration to the second configuration, and vice versa.

In an exemplary application, when the thermostatic valve 24 is closed, that is, disposed in the first configuration illustrated in FIG. 4, fluid flow through the temperature regulator 20 is directed through the temperature regulator bypass outlet channel 44 and temperature regulator bypass outlet 40 to the engine 28, allowing the fluid to warm up. As the temperature of the fluid circulating through the temperature regulator 20 increases, the sensing element actuates the actuator 66 causing the second thermostatic valve housing portion 72 to progressively move to the relative position of FIG. 5 and on to the position illustrated in FIG. 6. As the second thermostatic valve housing portion 72 moves to the partially open position illustrated in FIG. 5, fluid flow through the temperature regulator 20 is directed through the temperature regulator bypass outlet channel 44 and temperature regulator bypass outlet 40 to the engine 28, as well as the temperature regulator outlet channel 46 and the temperature regulator outlet 38 to a fluid cooling structure, such as a radiator (not illustrated). Depending upon the temperature of the fluid, the actuator 66 may continue to move the second thermostatic valve housing portion 72 to the relative position of FIG. 6, directing all fluid flowing through the thermostatic valve 24 to the temperature regulator outlet channel 46 and the temperature regulator outlet 38 to the fluid cooling structure.

Similarly, as the temperature of the fluid circulating through the temperature regulator 20 decreases, the sensing element actuates the actuator 66 causing the second thermostatic valve housing portion 72 to progressively move from the relative positions illustrated in FIG. 6 toward the relative positions of FIG. 5, and possibly on to the position illustrated in FIG. 4, depending upon the temperature of the flowing fluid. As the second thermostatic valve housing portion 72 moves to the partially open position illustrated in FIG. 5, fluid flow through the temperature regulator 20 is again directed through the temperature regulator bypass outlet channel 44 and temperature regulator bypass outlet 40 to the engine 28, as well as the temperature regulator outlet channel 46 and the temperature regulator outlet 38 to the fluid cooling structure.

Thus, when at least one of the thermostatic valves 24 is disposed in the first configuration, a first temperature regulator flowpath through the temperature regulator 20 is defined through the temperature regulator inlet 36, at least one of the plurality of thermostatic valves 24 disposed in the first configuration, the holder bypass outlet opening 62, and the temperature regulator bypass outlet 40. Conversely, when at least one of the thermostatic valves 24 is disposed in the second configuration, a second temperature regulator flowpath through the temperature regulator 20 is defined through the temperature regulator inlet 36, the at least one of the plurality of thermostatic valves 24 disposed in the second configuration, the holder outlet opening 64, and the temperature regulator outlet 38.

In order to removably couple the thermostatic valve holder 26 to the housing 22, the thermostatic valve holder 26 and the housing 22 include engaging structures 80, 82, respectively. The engaging structures 80, 82 may be of any appropriate design that permits the removable coupling of the thermostatic valve holder 26 to the housing 22. As shown in FIGS. 2-3, the engaging structure 80 of the thermostatic valve holder 26 may include, for example, one or more flanges 84 having one or more through holes 86, while the engaging structure of the housing 22 may include one or more bores, as will be understood by those of skill in the art. In this way, the flange(s) 84 may be disposed along the outer surface 54 of the housing 22 to limit the depth to which the wall 56 of the thermostatic valve holder 26 and the associated thermostatic valve 24 may be disposed within the valve chamber 48 of the housing 22. The engaging structure 80 of the thermostatic valve holder 26 may also include one or more fasteners 90 disposed through the through holes 86 of the flange(s) into the bore(s) 88 of the housing 22 to removably couple the thermostatic valve holder 26 to the housing 22. While not visible in the figures, those of skill in the art will understand that the fastener(s) 90 and bore(s) 88 may include, for example, mating threads.

It will further be understood that the engaging structures 80, 82 may be of an alternate design. For example, a portion of a peripheral surface of the wall 56 of the thermostatic valve holder 26 and the adjacently disposed portion of the housing 22 may include mating threads. By way of further example, a bracket (not illustrates) may be disposed over a flange 84 or upper surface of the thermostatic valve holder 26 and the outer surface 54 of the housing 22; in such an arrangement, the bracket be secured to the housing 22. Other engaging structures 80, 82 may be utilized.

Figure 7:
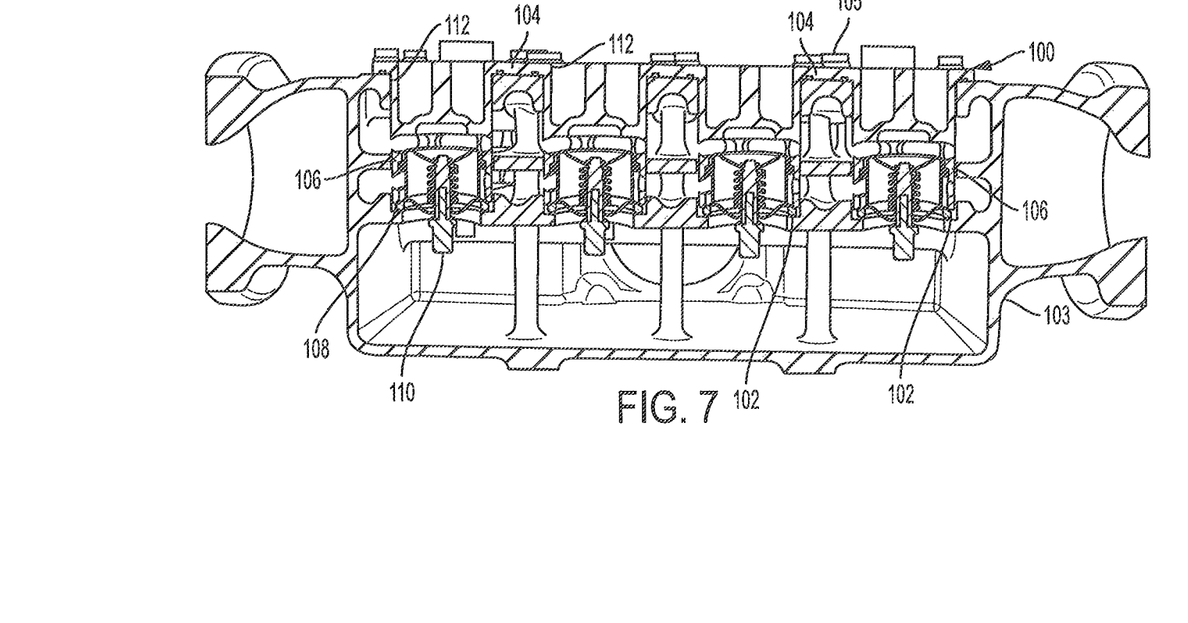
FIG. 7 is a cross-sectional view of the an alternative embodiment of a temperature regulator in accordance with teachings of this disclosure.

In the embodiment of FIGS. 2-3, the number of individual thermostatic valve holders 26 and the number of valve chamber openings 52 are each equal to the number of valve chambers 48, the particular embodiment including eight individual thermostatic valve holders 26 and eight valve chamber openings 52. It will be appreciated, however, that the number of thermostatic valve holders may be fewer than the number of valve chambers. For example, the number of thermostatic valve holders 100 may be fewer than the number of valve chambers 102 of the housing 103, as illustrated, by way of example only, in FIG. 7, in which a single flange 104 having a number of through holes for receipt of fasteners 105 is provided. In the embodiment of FIG. 7, thermostatic valve holder 100 includes two walls 106, each of which includes a channel 108. Two thermostatic valves 110 are disposed respectively in the channels 108. During service, the single thermostatic valve holder 100 may be removed from associated valve chamber openings 112 to access both of the thermostatic valves 110. While the thermostatic valve holders 100 of FIG. 7 each include a pair of pair of walls 106 including respective channels 108 for receipt of respective thermostatic valves 110 and disposition through respective valve chamber openings 112 in the housing 103, those of skill in the art will appreciate that a thermostatic valve holder may include a greater number of walls including respective channels for receipt of respective thermostatic valves and disposition through respective valve chamber opening 112 in the housing. For example, a single thermostatic valve holder may include three, four, or more walls including respective channels for receipt of respective thermostatic valves and disposition through respective valve chamber openings in the housing.

While the arrangement is described in detail as an outlet control, that is, controlling the temperature of the coolant coming out of the engine, those of skill in the art will appreciate that the temperature regulator may be used as an inlet control. That is, the temperature regulator may be used in an arrangement regulating the coolant going into the engine. In such an arrangement, for example, the temperature regulator may be plumbed within the system to provide a flow of hot fluid to the temperature regulator bypass outlet 40, and cold fluid from a radiator or other source may be provided to the temperature regulator outlet 38; a regulated coolant flow would then be provided to the temperature regulator inlet channel 42 and on to the temperature regulator inlet 36. In such an arrangement, the first and second temperature regulator flowpaths would be as described above and as in the appended claims, but the flow through the flowpaths would be in the direction opposite to that described above.

INDUSTRIAL APPLICABILITY

The present disclosure is applicable to temperature regulators, fluid temperature control systems and machines including such fluid control systems. The temperature regulator 20 is configured as unitary housing 22 with thermostatic valve holders 26 that plug into the unitary housing 22. The thermostatic valve holders 26 position the thermostatic valves 24 within valve chambers 48 of the housing 22 to provide the fluid flow control channels and seal the housing 22.

Accordingly, the disclosed arrangement may provide fabrication advantages over current two part housing designs. The disclosed arrangement simplify one or both of the casting and machining of the housing. As a result, the disclosed arrangement may reducing the cost of the housing.

The disclosed arrangement may provide for simplified service of the thermostatic valve(s) and associated savings. A thermostatic valve may be serviced and accessed by removing the associated thermostatic valve holder. Service of one or more thermostatic valves may not require removal of the temperature regulator housing from a piping circuit of the fluid control system. One or both of these features may reduce one or both of the difficulty and time required to service the temperature regulator. Accordingly the disclosed arrangement may reduce costs associated with service of one or more thermostatic valve of the disclosed arrangement.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A fluid temperature regulator for a machine, the fluid temperature regulator comprising
   a unitarily-formed housing including
      a temperature regulator inlet,
      a temperature regulator outlet,
      a temperature regulator bypass outlet,
      a plurality of valve chambers, and
      a plurality of valve chamber openings,
   at least one thermostatic valve holder disposed within at least one of the plurality of valve chamber openings and at least partially within at least one of the plurality of valve chambers, the thermostatic valve holder including at least one wall defining at least one channel and a holder inlet opening into the channel, the wall further including at least one holder outlet opening and at least one holder bypass outlet opening,
   a plurality of thermostatic valves, the plurality of thermostatic valves being equal in number to the plurality of valve chambers, each of the plurality of thermostatic valves being configured to operate in each of a first configuration and a second configuration, at least one of the plurality of thermostatic valves being disposed through the holder inlet and at least partially within the at least one channel of the at least one thermostatic valve holder and partially within the at least one of the plurality of valve chambers, such that the at least one of the plurality of thermostatic valves and the at least one thermostatic valve holder are removable from the at least one of the plurality of valve chambers through the at least one of the plurality of valve chamber openings,
   said at least one thermostatic valve holder and at least one of the plurality of thermostatic valves defining a first temperature regulator flowpath through the temperature regulator and a second temperature regulator flowpath through the temperature regulator,
      wherein the first temperature regulator flowpath through the temperature regulator is defined through the temperature regulator inlet, said at least one of the plurality of thermostatic valves disposed in the first configuration, the holder bypass outlet opening of said at least one thermostatic valve holder, and the temperature regulator bypass outlet, and
      wherein the second temperature regulator flowpath through the temperature regulator is defined through the temperature regulator inlet, the at least one of the plurality of thermostatic valves disposed in the second configuration, the holder outlet opening of said at least one thermostatic valve holder, and the temperature regulator outlet.

2. The fluid temperature regulator of claim 1 further including an inlet connection fluidly coupled to the temperature regulator inlet, an outlet connection fluidly coupled to the temperature regulator outlet, and a bypass outlet connection fluidly coupled to the bypass outlet.

3. The fluid temperature regulator of claim 1 including a plurality of thermostatic valve holders, the plurality of thermostatic valve holders being equivalent in number to the plurality of thermostatic valves, the plurality of thermostatic valves being disposed respectively within the plurality of thermostatic valve holders, the plurality of thermostatic valve holders being removably disposed respectively at least partially within the plurality of valve chambers, each thermostatic valve holder including at least one wall defining at least one channel and a holder inlet opening into the channel, the at least one wall of each of the plurality of thermostatic valve holders further including at least one holder outlet opening and at least one holder bypass outlet opening.

4. The fluid temperature regulator of claim 1 further including at least one fastener, the fastener being disposed to removably couple the at least one thermostatic valve holder to the housing.

5. The fluid temperature regulator of claim 4 wherein the housing includes an outer surface, and the at least one thermostatic valve holder includes at least one flange, the at least one flange being disposed along the outer surface of the housing adjacent the at least one of the valve chamber openings.

6. The fluid temperature regulator of claim 5 wherein the at least one flange includes a flange opening, and the fastener extends through the opening into the housing.

7. The fluid temperature regulator of claim 1 wherein the at least one thermostatic valve holder is removably disposed within at least two of the plurality of valve chamber openings and at least partially within at least two of the plurality of valve chambers, the thermostatic valve holder including at least two walls defining at least two channels, each of the at least two walls including a holder inlet opening into the respective channel, at least one holder outlet opening and at least one holder bypass outlet opening, wherein the at least two walls are disposed through respective holder inlets and at least partially within the associated channel.

8. The fluid temperature regulator of claim 1 wherein the at least one thermostatic valve is a wax thermostatic valve.

9. The fluid temperature regulator of claim 1 wherein the plurality of valve chamber openings includes at least eight valve chamber openings, the plurality of valve chambers includes at least eight valve chambers, the plurality of valve chamber openings includes at least eight valve chamber openings, the at least one thermostatic valve holder includes at least eight thermostatic valve holders removably disposed within the at least eight valve chamber openings and at least partially within at least eight valve chambers, each of the thermostatic valve holders including at least one wall defining at least one channel, a holder inlet opening into the channel, at least one holder outlet opening and at least one holder bypass outlet opening, the plurality of thermostatic valves including at least eight thermostatic valves, each of the eight thermostatic valves including the first configuration and the second configuration, each of the eight thermostatic valves being disposed through a respective one of the eight holder inlets and at least partially within a respective one of the eight channels.

10. The fluid temperature regulator of claim 9 wherein
   the first temperature regulator flowpath through the temperature regulator is defined through the temperature regulator inlet, at least two of the plurality of thermostatic valves disposed in the first configuration, the respective holder bypass outlet openings associated with the at least two of the plurality of thermostatic valves, and the temperature regulator bypass outlet, and
   the second temperature regulator flowpath through the temperature regulator is defined through the temperature regulator inlet, the at least two of the plurality of thermostatic valves disposed in the second configuration, the respective holder outlet openings associated with the at least two of the plurality of thermostatic valves, and the temperature regulator outlet.

11. The fluid temperature regulator of claim 1 wherein the unitarily formed housing includes a wall, the fluid temperature regulator further including a vent disposed through the wall.

12. The fluid temperature regulator of claim 1 further including attachment structures for coupling the housing to the engine.

13. The fluid temperature regulator of claim 1 wherein the unitarily-formed housing is formed by casting metal.

14. The fluid temperature regulator of claim 1 wherein the at least one thermostatic valve holder further includes at least one sealing wall, the at least one sealing wall including a cylindrical sidewall and a base, the at least one thermostatic valve holder including an upstanding central post extending outward from the base such that the post is accessible from the exterior of the housing.

15. An engine including a cooling system including the fluid temperature regulator of claim 1.

\* \* \* \* \*